May 7, 1935.　　　　B. M. SHIPLEY　　　　2,000,101
CASH REGISTER
Filed July 24, 1930　　　　8 Sheets-Sheet 1
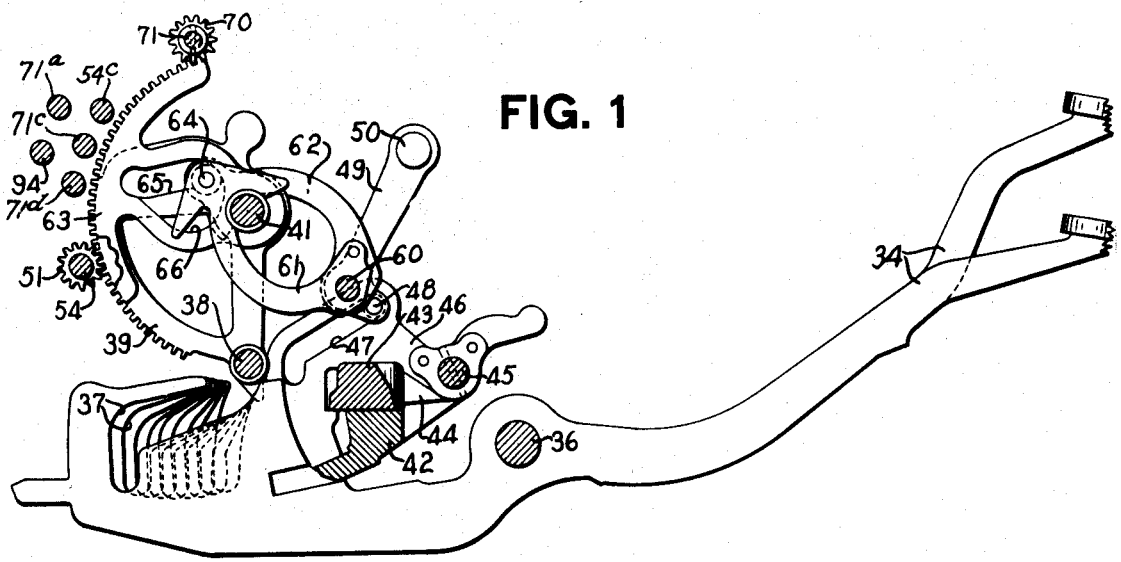
Inventor
Bernis M. Shipley
By
Earl Beust
His Attorney May 7, 1935.  B. M. SHIPLEY  2,000,101
CASH REGISTER
Filed July 24, 1930  8 Sheets-Sheet 2

Inventor
Bernis M. Shipley
By
Earl Bent
His Attorney,

May 7, 1935.  B. M. SHIPLEY  2,000,101

CASH REGISTER

Filed July 24, 1930  8 Sheets-Sheet 3

Inventor
Bernis M. Shipley
By
Earl Beust

His Attorney

May 7, 1935.  B. M. SHIPLEY  2,000,101

CASH REGISTER

Filed July 24, 1930  8 Sheets-Sheet 4

Inventor
Bernis M. Shipley
By
Carl Benst

His Attorney

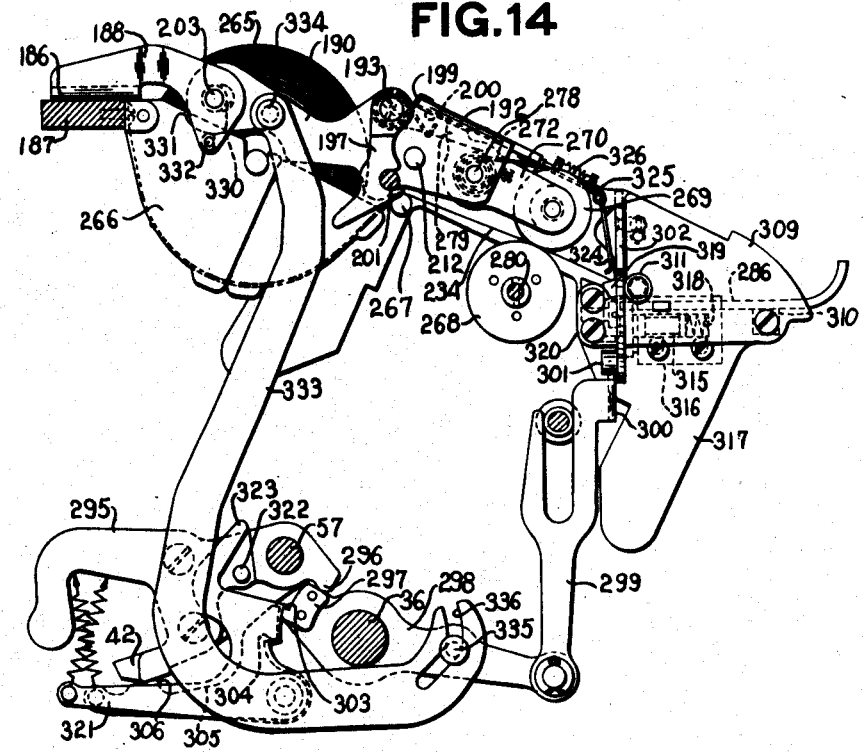
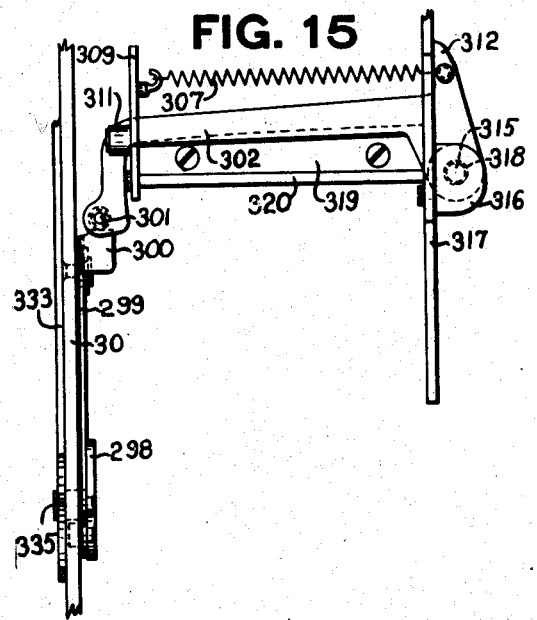

May 7, 1935.   B. M. SHIPLEY   2,000,101
CASH REGISTER
Filed July 24, 1930   8 Sheets-Sheet 6
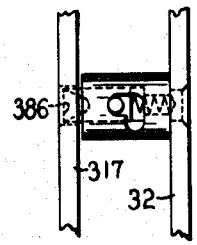
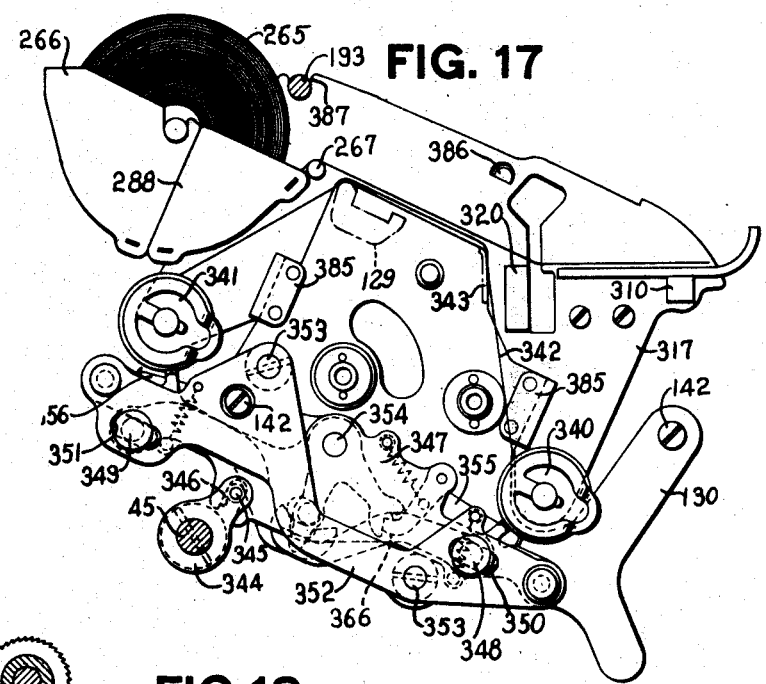
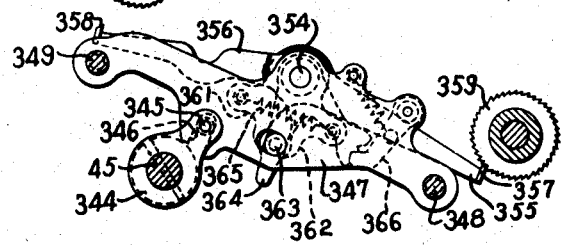
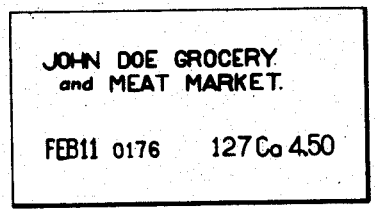
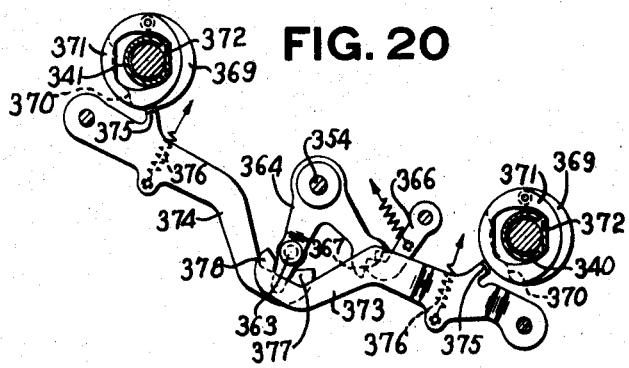
Inventor
Bernis M. Shipley
By
Earl Bentt
His Attorney May 7, 1935.  B. M. SHIPLEY  2,000,101
CASH REGISTER
Filed July 24, 1930  8 Sheets-Sheet 7

Inventor
Bernis M. Shipley
By Earl Benst
His Attorney

May 7, 1935.  B. M. SHIPLEY  2,000,101
CASH REGISTER
Filed July 24, 1930        8 Sheets-Sheet 8
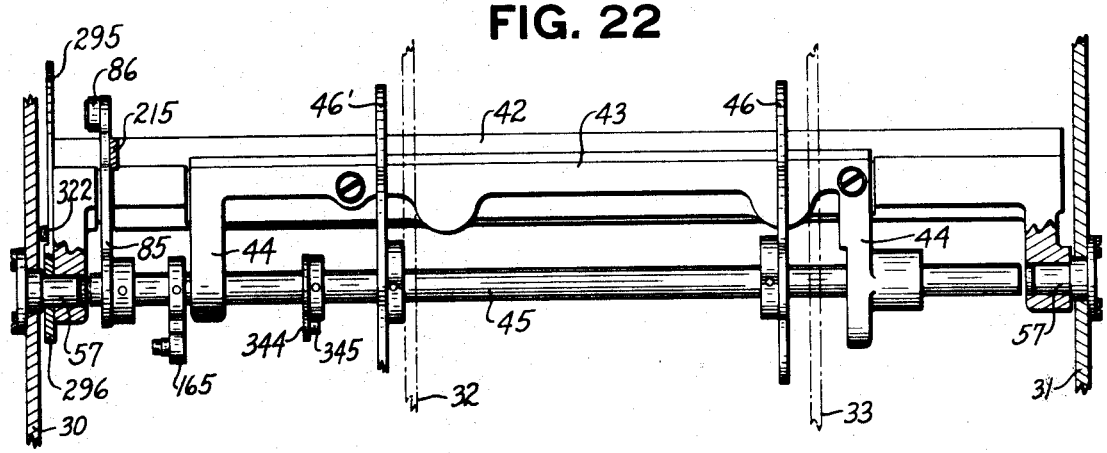
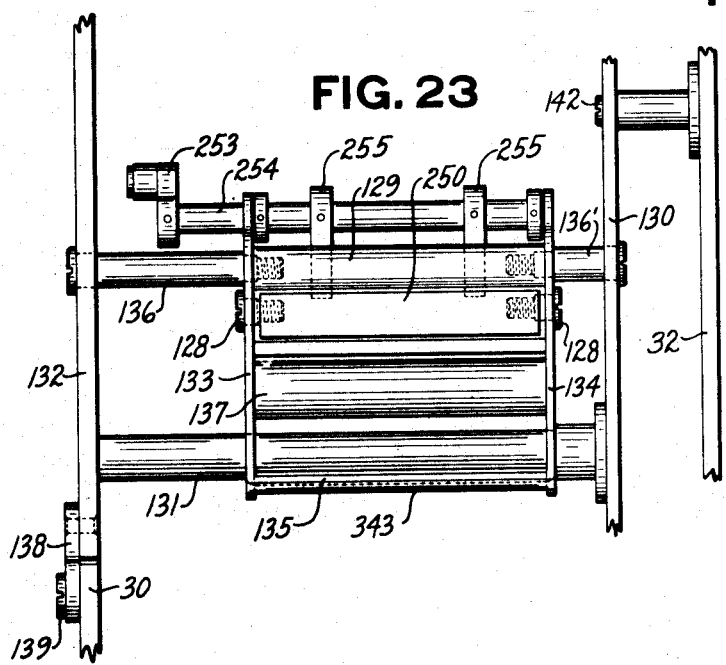
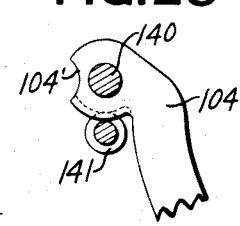
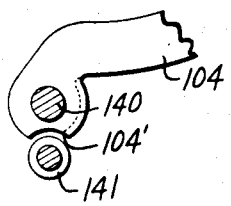
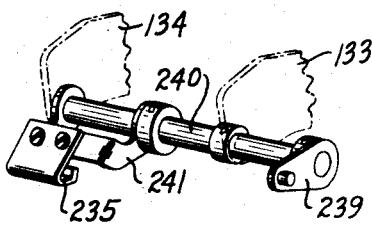
Inventor
Bernis M. Shipley
By
Earl Benst
His Attorney Patented May 7, 1935

2,000,101

UNITED STATES PATENT OFFICE 2,000,101

CASH REGISTER

Bernis M. Shipley, Dayton, Ohio, assignor to The National Cash Register Company, Dayton, Ohio, a corporation of Maryland Application July 24, 1930, Serial No. 470,366

14 Claims. (Cl. 235—3)

This invention relates to improvements in registers and like machines, and more particularly to printing mechanisms. For illustrative purposes, the invention is shown as applied to a key-operated or "press-down" key type of machine.

The printing mechanism of the present invention is particularly well suited for use with machines of the type disclosed in applications for United States Letters Patent, Serial Nos. 261,996 (now Patent No. 1,804,650) and 334,482, filed March 15, 1928, and January 23, 1929, respectively, by Bernis M. Shipley.

Heretofore it has been extremely difficult to produce a machine of the key-operated or "press-down" key type, which, when required to print, issue, and sever a receipt on each operation of the machine, operated with a degree of ease that it could be commended to the public.

It is an object of this invention to provide novel check printing, severing and issuing mechanisms particularly adapted for use in key-operated machines, such mechanisms being operable directly by the keys.

Another object of this invention is to construct the several functional units so that they may be easily assembled and disassembled, thus facilitating the assembling conditions in manufacturing.

With these and incidental objects in view, the invention consists of certain novel features of construction and combinations of parts, the essential elements of which are set forth in appended claims and a preferred form or embodiment of which is hereinafter described with reference to the drawings which accompany and form a part of this specification.

In said drawings:

Fig. 1 shows a group of keys and the differential associated therewith.

Fig. 2 is a diagrammatic view of the pinion lines for transmitting the values of the depressed keys to the printer.

Fig. 14 is a side elevation of the operating mechanism for the severing means, and shows the supply roll and the feeding rollers for the receipt.

Fig. 14A is a detail view of a part of the mechanism shown in Fig. 14.

Fig. 15 is a front elevation of the severing means.

Fig. 16 is a detail view showing the method of locking the ribbon frame in the machine.

Fig. 17 is a side view of the ribbon feed and reversing mechanisms, and illustrates another unit construction.

Fig. 18 is a detail view of a part of the ribbon feed mechanism.

Fig. 19 is a facsimile of the receipt issued by the machine.

Fig. 20 is a detail view of a part of the ribbon reversing mechanism.

Fig. 22 is a plan view of the key coupler and some of the elements actuated thereby.

Fig. 23 is a detail view of a part of the framework of the machine.

Fig. 24 is a sectional view of the elements shown in Fig. 25.

Fig. 25 is a detail view taken on line 25—25 of Fig. 24.

Fig. 26 is a detail view showing the mechanism disclosed in Fig. 25 in moved position.

Fig. 27 is a perspective view of the type wheel aliner.

General description

Figure 3:
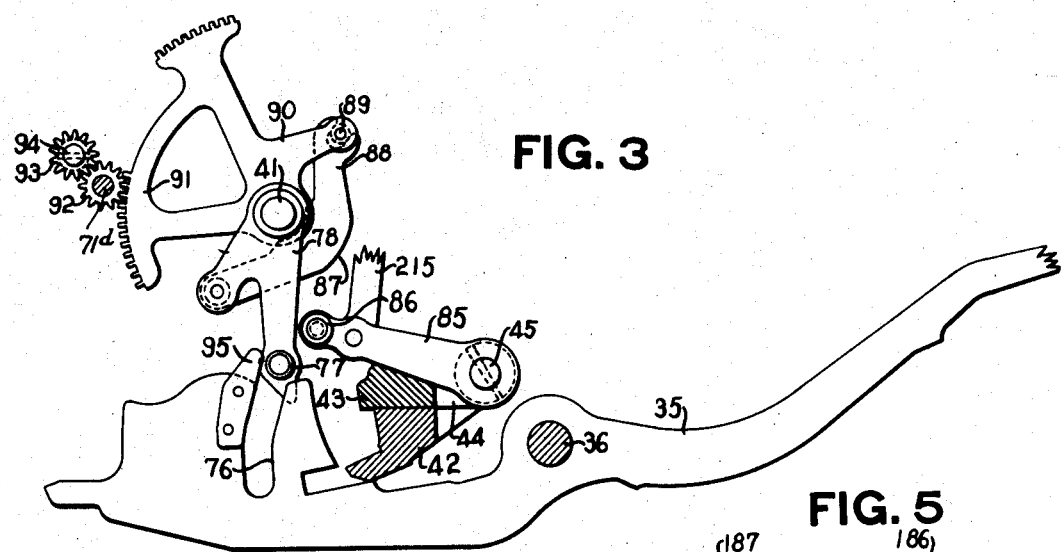
Fig. 3 is a detail view of a transaction key and its differential.

The preferred form of the present invention, as illustrated herein, is applied to a machine of the key-operated or "press-down" key type of machine, which comprises a plurality of denominational groups or sets of keys. The keys in this class of machine, when depressed, operate the register to set indicators, add the amount into a totalizer, and print that amount on a record strip, which is retained within the register.

As this invention applies more particularly to mechanism for the printing, severing and issuing of a receipt, the indicators, totalizer, and the record strip mechanism have been omitted.

The printer of the type chosen to be illustrated, is provided with a type wheel line to print the date, consecutive number, register number, transaction, and the amount involved in the transaction. The date wheels are adjusted by individual knobs; a turn-to-zero knob is provided to reset the consecutive number wheels to zero; and the register number wheels are set when the machine leaves the factory, or they can be adjusted to various numbers by raising the cabinet and turning the wheels with a pencil or some other pointed object. The register number wheels are held in their adjusted positions by spring tensioned pawls.

The amount and the transaction type wheels are set by the depressed keys, through their respective differentials having minimum movement segments meshing with pinions secured to their associated shafts. The shafts carrying the pinions, position racks which set the amount wheels, and the transaction wheel.

A platen of the squeeze impression type is provided to print the amount on a check or receipt which is fed from a roll suitably supported by the machine. Feed rollers advance the printed receipt from the machine through a slot to a small table, and then the receipt is severed by a pivoted knife.

The platen and the upper feed rollers are assembled as a unit in a frame which is adapted to swing upwardly to permit the insertion of a new supply roll for the receipt. The raising of the frame also spreads the blades of the knife so that no obstruction is in the path of the strip when inserting a new supply roll.

The new receipt supply roll is then placed in a guide or pocket made in two sections, one of which is secured to the ribbon frame, and the other secured to a cross tie-bar of the machine frame. The lead end of the roll is drawn forwardly over the type wheels and ribbon and passed between the knife blades, after which the frame carrying the platen is lowered, and the machine is then ready for operation.

An ink ribbon and feeding and reversing means therefor, of unit construction, is removably mounted in the machine just below the platen unit. A novel mechanism is provided to advance the ribbon during each operation of the machine, and reverse the direction of the feed when the ribbon has advanced its maximum amount.

A non-print manipulative device is provided to control the printing and issuing mechanisms so that the machine may be operated without issuing a check or receipt when desired.

Detail Description

Frames

The machine illustrated has two main side frames 30 and 31 (Fig. 2) suitably supported at opposite ends of a base. Intermediate frames 32 and 33 suitably supported in the machine provide a framework to support the totalizer (not shown) and the differentials associated therewith.

Amount keys

The keyboard of the machine illustrated includes a plurality of groups or sets of denominational keys 34, and a transaction key 35 (Figs. 1, 2 and 3).

Differentials

The amount keys shown in Fig. 1, represent the dimes denomination, each of the other denominational groups of keys being similar in construction. The dimes amount keys 34 are journaled intermediate their ends on a universal rod 36 extending between and supported by the main side frames 30 and 31. The rearwardly extending arms of the keys 34 have differential slots 37 open at one end and adapted to cooperate with a universal bail 38, carried by a pair of differential segments 39 and 40 (Figs. 1 and 2) pivoted on a cross rod 41, supported by the main side frames 30 and 31.

Depression of an amount key 34 engages the mouth of its cam slot 37 with the bail 38, and continued depression of the key rocks the differential segment 39 in clockwise direction a distance corresponding to the value of the depressed key.

It can be seen in Fig. 2, that the depression of the ten-cent or the ninety-cent key, due to the keys being at the extreme opposite ends of the bail 38, would tend to strain and twist the frame comprised of the segments 39 and 40 and the bail 38. That is, the differential segment opposite the one in close proximity with the depressed key might lag behind the one adjacent the operated key. Moreover, any variations in manufacturing might also result in such lagging of that differential segment.

Therefore, to insure a uniform movement between the differential segments 39 and 40, there are provided pinions 51 and 52 which are journaled on a shaft 54. The pinions 51 and 52 are connected by a tube 53 and mesh with the differential segments 39 and 40 to form a rigid drive connection. Thus, any movement given to the differential segments 39 or 40 by a key in close proximity, is transferred by the pinions 51 and 52 and tube 53, to its companion differential segment, thereby providing an exactly equal or uniform movement for both segments.

The pennies keys 34a are also journaled intermediate their ends on the universal rod 36. The rearwardly extending arms of the keys 34a also have differential slots, similar to the slots 37 of the dimes keys 34, open at one end and adapted to cooperate with a universal bail 38a (Fig. 2), carried by a pair of differential segments 39a and 40a, pivoted on the cross rod 41.

Depression of a key 34a engages the mouth of its cam slot with the bail 38a, and continued depression of the key rocks the differential segment 39a in a clockwise direction a distance corresponding to the value of the depressed key.

Pinions 51a and 52a, journaled on the shaft 54, mesh with segments 39a and 40a. These pinions are connected by a sleeve 53a, to insure uniform movement of the segments 39a and 40a.

The dollars keys 34c are also journaled intermediate their ends on the universal rod 36, and are each provided with differential slots, adapted to cooperate with a universal bail 38c, carried between a pair of differential segments 39c and 40c, pivoted on the cross rod 41. The differential segment 39c is rocked clockwise a distance corresponding to the value of the key depressed, in the same manner as the segment 39 is rocked by the keys 34, described above.

Pinions 51c and 52c, pinned on shaft 54c, mesh with the segments 39c and 40c, to insure uniform movement of the segments 39c and 40c.

Depression of a key also rocks a key coupler 42 clockwise. The key coupler is pivoted on trunnions 57, (Figs. 10, 14 and 22) projecting inwardly from the main side frames 30 and 31. The limit of the clockwise movement of the key coupler is reached when the key arrives at the limit of its clockwise movement, after which the key coupler, by its weight resting on the rearwardly extending arm of the key, restores the depressed key to its normal position.

A minimum movement device, similar to that disclosed in the above Patent No. 1,804,650, associated with each denominational group of keys and operated by the depression of the keys through the key coupler 42, sets indicator wheels (not shown) to display the value of the depressed key, and adjusts type carriers from their previous to their selected positions.

A bar 43 (Figs. 1 and 22) secured to the key coupler 42 carries brackets 44, the forwardly extending ends of which support a shaft 45 in axial alignment with the key coupler trunnions 57. Cam plates 46 and 46' mounted on the shaft 45 extend rearwardly across the bar 43 and hook under the overhanging edge thereof, and are thus driven by the key coupler 42 upon depression of a key.

Figure 11:
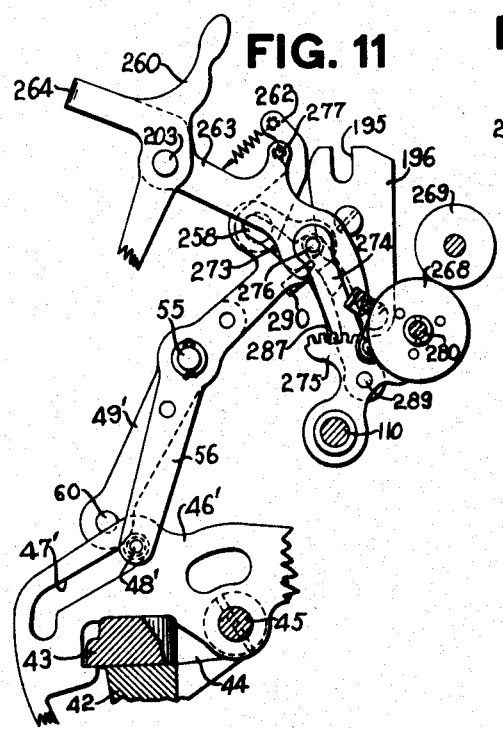
Fig. 11 is a detail view of the drive for the feeding mechanism, and the manual control over the same.

A cam slot 47 cut in the cam plate 46 (Fig. 1) receives a stud 48 carried by a depending arm 49 pivoted on a stud 50 projecting inwardly from the intermediate frame 33. An arm 49' (Fig. 11) pivoted on a stud 55, mounted in the intermediate frame 32, is secured to a feed roll driving lever 56, to be hereinafter described which also carries a stud 48' cooperating with the cam slot 47' of the cam plate 46'.

A rod 60 (Figs. 1 and 11) extending between and journaled in the depending arms 49 and 49' carries a pair of companion links 61 and 62. The companion links 61 and 62 are bowed in opposite directions to form an opening surrounding the cross rod 41, the opening terminating at their left or free ends in seats or notches to engage the rod 41 when the links are at rest in their normal or home positions. At their free ends, the links 61 and 62 are spaced apart by a stud 64, thus providing space between them for the differential segment 39 and a toothed minimum movement segment 63 pivoted on the cross rod 41. The stud 64 rigidly connects the two rear ends of the companion links 61 and 62. The stud 64 projects through a cam slot 65 of the interposed differential segment 39 and through a heart-shaped opening 66 in the minimum movement segment 63. When the links 61 and 62, together with the stud 64 are moved rearwardly, as hereinafter described, the stud follows a slot 65 in the differential segment 39, which slot guides the links 61 and 62 to unseat the notches from the rod 41 to permit the links to pivot on the rod 60 as they are moved rearwardly by arms 49 and 49'.

The links 61 and 62 are bowed to form a clearance for the rod 41 after the links are unseated from the rod 41. This clearance is necessary since the links pivot on the rod 60 a distance depending on the position to which the segment 39 and slot 65 have been set by the depressed key. Such position of segment 39 and slot 65 depending upon the value of the key which has been depressed.

The above mechanism, while different in certain details of construction, is similar, in principle and operation, to that disclosed in Figs. 2 and 17 of Letters Patent of the United States No. 1,804,650.

When a key 34 is depressed the cam slot 37 will engage the bail 38 and rock the differential segment 39 in clockwise direction a distance corresponding to the value of the depressed key. Just prior to the start of this movement of the differential segment 39, the rod 60 carrying the companion links 61 and 62 starts moving to unseat the links from the rod 41, through the cam slots 47 and 47' of the cam plates 46 and 46', which plates, it will be recalled, are connected to the key coupler 42. The stud 64, connecting the companion links 61 and 62, by following the slot 65 of the differential segment 39 associated therewith, positions the minimum movement segment 63, by cooperating with either the upper or lower face of the heart-shaped opening 66 depending upon whether the depressed key is of higher or lower value than the one of the same denomination depressed in the previous operation of the machine.

As viewed in Fig. 1, the depression of any one of the keys 34, and the clockwise movement of the differential 39, through the rearward movement of the stud 64 acting on the upper face of the heart-shaped opening 66, positions the minimum movement segment 63 in accordance with the value of the key depressed.

If, however, on the following operation a key of lower value than the one in the previous operation is depressed, the stud 64, on its rearwardly movement, will travel in the slot 65 of the differential segment 39 and act on the lower face of the heart-shaped opening 66 of the minimum movement segment 63, thus moving the latter from the previously set position to the new position, according to the value of the depressed key.

Thus, during an operation of the machine the minimum movement segment 63 is always adjusted directly from its previously set position to the newly selected position, traveling the minimum amount of movement.

Mechanism (not shown) aligns the minimum movement segment 63 in its selected position. The key coupler 42 returns the key to its normal position, and the differential segment 39 is returned to normal position by the return movement of the key. At the same time the cam plates 46 and 46' return the companion links 61 and 62 and stud 64 to their normal positions, such movement being permitted by the heart-shaped opening 66.

A pinion 70, secured on a shaft 71 journaled in the flanges 83 and 84 of a cross bar 137 (Figs. 2 and 10), mounted on the inner sides of the main side frames 30 and 31, and in mesh with the minimum movement segment 63, sets the indicators (not shown) to display the value of the depressed key, and the type carriers, to be described later.

A similar differential unit is provided for the cents key bank and one for the dollars key bank. Inasmuch as all three differentials operate in the same manner, no separate description of these two differentials is deemed necessary.

However, the construction of the indicator setting varies slightly, and this variation is explained below.

The minimum movement segment 63a for the cents differential meshes with a pinion 70a, loose on a shaft 71c journaled in brackets 72 and 73 (Fig. 2) mounted on the inner sides of the main frames 30 and 31. The pinion 70a meshes with a pinion 69 pinned on shaft 71a, also journaled in the frames 72 and 73. The shaft 71a connects with the indicator setting mechanism for the cents bank (not shown herein), and with the cents type setting mechanism, hereinafter described.

The minimum movement segment 63c meshes with a pinion 70c, fast on shaft 71c, which shaft sets the indicator mechanism and type element for the dollars bank.

Another shaft 71d is provided for setting a transaction indicator, not described herein, and a type element, hereinafter described.

*Transaction differential*

The minimum movement segment associated with the transaction keys is adjusted to its various positions by a beam actuator in conjunction with the transaction keys. This construction being used to facilitate for compactness of the machine. The transaction key lever 35 (Fig. 3) journaled intermediate its ends on the universal rod 36, is provided with a cam slot 76 adapted to cooperate with an anti-friction roller 77 carried by a depending arm of a bell crank lever 78 journaled on the cross rod 41.

Assuming the parts to be in the positions shown in Fig. 3, a depression of the transaction key 35 causes the cam slot 76 acting on the anti-friction roller 77 to rock the bell crank lever 78 clockwise. At the same time the transaction key 35 is receiving its clockwise movement, the key coupler 42, the brackets 44, and shaft 45 are rocking clockwise. A beam actuating arm 85 secured to the shaft 45 carries an anti-friction roller 86 to cooperate with a face 87 of a beam 88 pivoted on the bell crank lever 78. The beam 88 is bifurcated to receive a stud 89 mounted in an arm 90 of a minimum movement segment 91 supported by the cross rod 41.

As the bell crank lever 78 is rocked clockwise by the depression of the transaction key 35, the beam 88 is pivoted clockwise around the shaft 41, and rocks the minimum movement segment 91 clockwise to position an indicator (not shown, but see Patent No. 1,804,650, supra) and a type carrier. At the same time the shaft 45 rocks the arm 85 clockwise to bring the anti-friction roller 86 into cooperative relation with the face 87 of the beam 88 to assist in positioning the beam 88 in a well known manner, as for example, like that shown in the United States patent to F. L. Fuller, No. 1,761,719.

The transaction key on its return movement to normal position cams the bell crank lever 78 counter-clockwise to its normal position, and the arm 85 and roller 86 are also rocked counter-clockwise with the key coupler 42 to their normal positions. The stud 89, being held stationary by mechanism (not shown) aligning the minimum movement segment 91, acts as a swivel for the beam 88 which rocks in a counter-clockwise direction around the stud 89 away from the cross rod 41 on the return counter-clockwise movement of the bell crank arm 78. The end of the beam is notched to embrace the stud 89, said notch being deep enough to permit the beam to slide on the stud 89 when the bell crank 78 is restored after leaving the segment 90 in its adjusted and alined position. The notch need not be very deep since the segment receives only a slight movement by slot 76 in key 35. This key 35 is the only one which adjusts bell crank 78, since only one transaction key is shown herein. If more keys are provided, and a greater movement is given to segment 90, the notch in the end of the beam will be made relatively deeper.

If, on the succeeding operation the transaction key is not depressed, the arm 85 on its clockwise movement from normal position causes the roller 86 to strike the face 87 of the beam 88 which was rocked away from the cross rod 41 in the previous operation, and rock the beam 88 counter-clockwise around its pivot on the bell crank lever 78 to rock the minimum movement segment 91 counter-clockwise from its previously set position to the position shown in Fig. 3. The bell crank lever 78 is held at this time against any clockwise movement by a block 95 mounted on the transaction key and extending into the path of the roller 77 on the bell crank lever 78.

The minimum movement segment 91 meshes with a pinion 92, in turn meshing with a pinion 93 secured to a shaft 94, to set type carriers.

*Type wheel setting*

The amount wheels 100 (Fig. 8) are adjusted to positions according to the values of the depressed keys, through the minimum movement segments 63, 63a and 63c. The transaction type wheel 99 is adjusted by the key 35, beam 88, segment 91, pinions 92 and 93, and shaft 94. Since the drive means intermediate the minimum movement segments and type wheels for the various numerical denominations and transaction type wheel are similar, all being driven from the previously mentioned group of shafts 54, 71, 71a, 71c, 71d, and 94, the drive for the transaction type wheel being the first segment shown in Fig. 7, will be the first one described.

A pinion 101 fast on the shaft 94, which receives its movement from the minimum movement segment 91, cooperates with an intermediate pinion 102 to set a segment 103 journaled on the cross rod 41. A link 104 removably mounted on the segment 103 of each denomination has a slot 105 at its forwardly extending end to surround a screw stud 106. The link 104 is also provided with a rack 107 meshing with a gear 108 pinned to a type wheel setting and aligning wheel 109 journaled on a rod 110. Thus, the differential setting of the minimum movement segment 91 is transmitted, through the pinions 101 and 102, segment 103, link 104, rack 107, gear 108, and wheel 109, to the type wheel 99.

Likewise, the settings of the minimum movement segment 63 is transmitted to its corresponding amount type wheel 100 through pinion 70, shaft 71, and a pinion 80 (Fig. 2).

The setting of the minimum movement segment 63a is transmitted to its type wheel through pinions 70a, 69, shaft 71a, and pinions 81 and 82. The pinion 81 is fast on the shaft 71a and meshes with the pinion 82 loose on shaft 54c, the latter meshing with the type wheel setting segment.

The setting of the minimum movement segment 63c is transmitted to its type wheel through pinion 70c fast on shaft 71c, and a pinion 79 also fast on shaft 71c. The pinion 79 meshes with the type setting segment.

A supporting arm 114 (Fig. 7) mounted on the cross rod 41, and having at its forwardly extending end a depending arm 115 resting on the universal rod 36, with a second arm 116 (Fig. 8) also resting on the universal rod 36 and spaced from the depending arm 115 by the screw stud 106 and a second stud 117, form a framework to support the forwardly extending ends of the links 104.

A hook 118 (Fig. 7) partly surrounding the universal rod 36 and secured to the arm 115 by screws 119, locks the supporting frame to the universal rod 30. A projection 120 of the supporting arm 115 enters a slot in a bracket 121 (Fig. 8) which supports the consecutive number aligning pawls to be hereinafter described, to hold the arms 115 and 116 against any lateral movement.

A printer frame 130 (Figs. 8 and 23) supported by studs projecting laterally from the intermediate frame 32 supports one end of a rod 131 (Fig. 7), the opposite end of the rod being supported by a removable section 132 of the main side frame 30. Plates 133 and 134 connected by a bail 135 and supported by the rod 131 form a type wheel frame which carries a tube 137. The type wheels 99 and 100, the consecutive number wheels, and the date wheels, to be hereinafter described, are all journaled on the tube 137.

The plates 133 and 134 (Fig. 23) are prevented from any rocking movement on the rod 131 by a shouldered screw 136 projecting laterally from the removable section 132 through the plate 133 into an electro-block 129 (see also Fig. 4), which extends between the plates 133 and 134 to form a brace. A second screw 136' projecting laterally from the printer frame 130, and in axial alignment with the screw 136, secures the plate 134 to the block 129 at the opposite end from the screw 136.

Thus, the rod 131 and the two screws 136 and 136', together with the block 129, firmly secure the type wheel frame comprised of the plates 133 and 134 and bail 135, between the printer frame 130 and the removable section 132 of the main side frame 30. Two additional screws 128 in axial alignment enter the block 129 from the plates 133 and 134 to aid in holding the block 129 in printing alignment.

The removable section 132 sets in a recess in the main side frame 30 and has ears 138 overlapping the side frame. Screws 139 hold the removable section 132 in its proper position. By removing the screws 139 and the screws 142 (Figs. 7 and 17) which secure the printer frame 130 to the intermediate frame 32, the frame 130 and section 132 may be removed bodily from the machine. These frames support the type wheel frame, the hereinafter described date-setting knobs, the turn-to-zero knob, the lower feed rollers, the rod 110, and the type wheel setting and aligning gear wheels 109. The parts just mentioned, with the two frames 130 and 132, form a removable printing unit easily assembled in the machine.

After the printing unit has been removed, the screw 106 can be removed and by turning the link 104 on its pivot 140, (Figs. 24 and 25) until a recess 104' of a beveled flange of the link 104, which normally cooperates with a beveled flange of a stud 141 to hold the link on its pivot 140, registers with the stud 141 as illustrated in Fig. 26, the link 104 may be removed from the machine.

Date printing wheels

Date printing wheels 149 (Fig. 8) are provided to print the date on each receipt issued by the machine. The date printing wheels 149 are set by date setting knobs 150 journaled on a trunnion 151 (Fig. 10) projecting inwardly from the removable section 132 of the main side frame 30. A gear 152 (Fig. 8) fast to each date setting knob 150 meshes with an intermediate gear 153 journaled on a second trunnion 154 (Fig. 10) also projecting inwardly from the removable section 132 of the main side frame. Gears 155 connected to nested tubes 156 surrounding the rod 110 mesh with the intermediate gears 153. The tubes 156 carry at their opposite end gears 157 in mesh with their respective date printing wheels 149 mounted on the tube 137 carried by plates 133 and 134 of the type wheel frame. Thus, by turning the knobs 150, through the gears 152, 153 and 155, tubes 156 and gears 157, the date printing wheels 149 are positioned according to the date setting knobs 150.

Consecutive number

Consecutive number wheels 158 (Fig. 8) mounted on the tube 137 are provided to print the consecutive number on each receipt issued by the machine. Mechanism advances the consecutive number printing wheels one step on each operation of the machine. Pinned to the rock shaft 45, (Fig. 9), which it will be recalled is carried by and rocks with the key coupler 42, is an arm 165 connected by a link 166 to a consecutive number operating yoke 167 supported on the rod 110. The yoke 167 carries a differentially tined pawl 168 cooperating with ratchet wheels 164 secured to the side of gears 169 meshing with gears secured to the sides of the printing wheels 158. As the key coupler 42 rocks the shaft 45 first clockwise and then counter-clockwise by the depression of a key, the yoke 167, through the arm 165 and link 166, is rocked first counter-clockwise and then clockwise, whereby the pawl 168 advances the lowest order printing wheel 158 one step. Spring tensioned aligning pawls 170 mounted in the bracket 121 cooperate with the ratchet wheels 164 secured to the side of each gear 169 to align the printing wheels 158.

A turn-to-zero wheel 171 (Fig. 8) is provided to reset the consecutive number printing wheels 158 to zero at the end of each day or at such time as the proprietor sees fit.

A shaft 172 (Fig. 10) of the turn-to-zero wheel 171 extends through the trunnion 151 supporting the date setting knobs 150 and carries a gear 173 (Fig. 8) at the opposite end from the wheel 171. The gear 173 meshes with an intermediate gear 174 mounted on a screw stud 175 (Fig. 10) extending into the second trunnion 154 carrying the intermediate gears 153, of the date setting knobs 150. The intermediate gear 174 meshes with a gear 176 mounted on a tube 177 (Fig. 9) surrounding the rod 110 and having an L shaped notch cooperating with pawls, (not shown), carried by the ratchet wheels 164, to reset the consecutive number printing wheels to zero.

Type wheels 178 (Fig. 8) mounted on the tube 137 are provided to print a designating or register number. These wheels 178 are aligned in the same manner as the consecutive number wheels 158, that is, by spring tensioned aligning pawls mounted in the bracket 121 and cooperating with ratchet wheels secured to the sides of gears in mesh with the respective printing wheels 178. The designating or register number wheels 178 are adjusted by inserting a pencil or any other suitable means between the type faces and turning the wheels 178 until the desired number is in proper alignment to print on the receipt.

Impression mechanism

A platen 185 (Figs. 4 and 5) of the squeeze impression type is provided to print the amount, transaction character, register number, consecutive number and date on the receipt.

A bracket 186 mounted on a frame cross bar 197 extending between the main side frames 30 and 31, is provided with two forwardly extending arms 188 and 189 to support two rearwardly extending arms 190 and 191 of a yoke 192. The forward ends of the arms 190 and 191 of the yoke 192 are supported by a shaft 193 extending through the arms 190 and 191 and into a notch 194 (Figs. 5 and 7) of the removable section 132 of the main side frame 30. The opposite end of the shaft 193 enters a notch 195 (Figs. 5 and 11) of a bracket 196 secured to the intermediate side frame 32.

Locking pawls 197 and 198 (Figs. 5, 10 and 14) pinned at the opposite ends of the shaft 193 are normally urged in a counter-clockwise direction by a torsion spring 199 to cooperate with studs 201 and 202 (Fig. 5) carried by the removable section 132 and the bracket 196, respectively, to lock the yoke 192 in its position. The spring 199 is carried by the shaft 193 and has one end hooked over the edge of the yoke 192 (Figs. 14 and 14A), and the other end hooked under a release arm 208 pinned to the shaft 193.

Arms 210 and 211 (Figs. 4 and 5), pinned to a shaft 212 journaled in the arms 190 and 191, are connected by a bail 213 to carry an inverted channel bar in which the platen 185 is secured.

The means for taking the impression is accomplished by the previously described rock shaft 45 and a cam 219.

The beam actuating arm 85, which is secured to the shaft 45 (Fig. 3), is connected to the lower end of a link 215 (Figs. 4 and 10) the upper end of which is connected by a stud 216 to an arm 217 pivoted on a stud 218 mounted in the removable section 132 of the main side frame 30.

Figure 6:
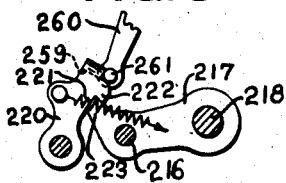
Fig. 6 is a detail of a part of the impression operating mechanism.

The impression cam 219 also mounted on the stud 218 is provided with a short rearwardly extending arm carrying a pawl 220. A spring 221 extending between studs carried by the pawl 220 and the impression cam 219, normally positions a hook 222 of the pawl 220 (Fig. 6) over a projection 223 of the arm 217. As the shaft 45 is rocked clockwise the arm 85, link 215, and the projection 223 of the arm 217, cooperating with the hook 222 of the pawl 220 carried by the cam 219, rock the cam 219 clockwise. As the shaft 45 is rocked counter-clockwise, the stud 216 of the arm 217 extending through an arcuate shaped slot 224 in the cam 219, returns the cam 219 to its normal position. A stud 225 mounted in the main side frame 30 prevents any counter-clockwise movement of the cam 219 past its normal position.

An arm 230 pinned to the shaft 212 carries a roller 231 held against the periphery of the cam 219 by a coil spring 232 mounted on the shaft 212. As the cam 219 receives its clockwise movement by the previously described mechanism, a rise 233 on the periphery of the cam 219 cooperates with the roll 231 of the arm 230 to rock the shaft 212 clockwise, whereby the platen 185, supported by the arms 210 and 211 carried by the shaft 212, forces the paper 204 against the adjusted type wheels to effect a printing impression on the receipt paper of the data set up on the various type wheels.

It will be noticed by referring to Fig. 1, that the lower portions of the differential cam slots 37 of the keys 34 are concentric with the universal rod 36, and the lower portion of the cam slot 47 of the cam plate 46 is concentric with its pivot point.

Therefore, the type carriers are in their adjusted positions at the time the various rolls cooperating with the cam slots 37, 47 and 47' reach the concentric portions of those slots. It is during this time when the rolls are in those concentric portions that the rise 233 (Fig. 4) of the cam 219 cooperates with the roll 231 of the arm 230 to rock the shaft 212 to take the impression from the adjusted type wheels.

Figure 4:
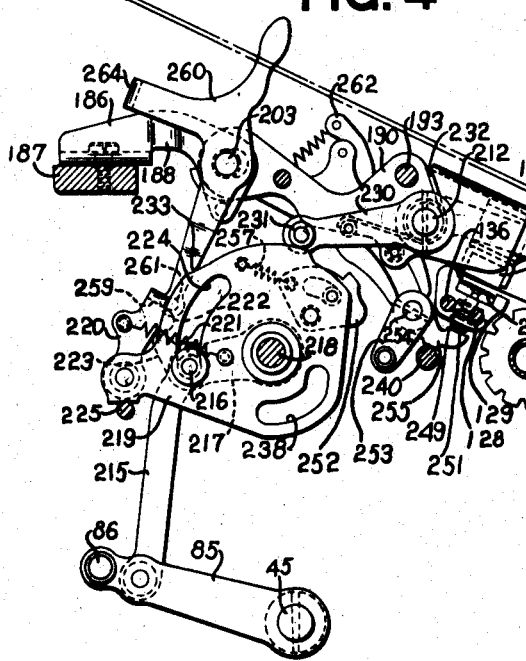
Fig. 4 is a side elevation of the platen operating mechanism, showing the unit construction of the platen.
Figure 5:
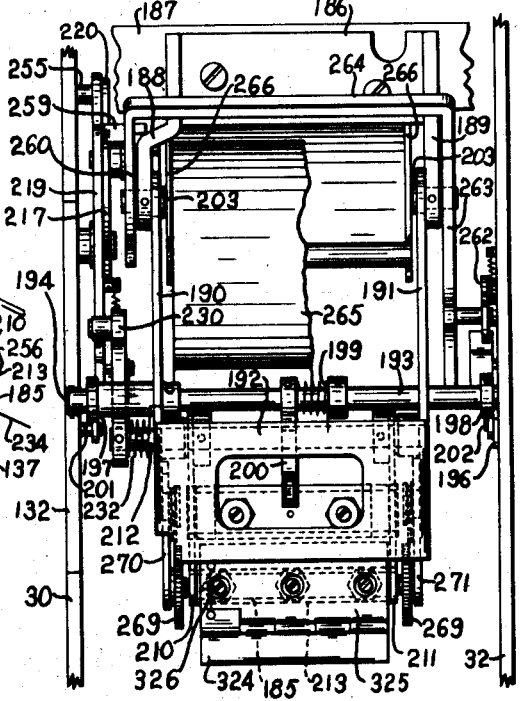
Fig. 5 is a plain view of the mechanism shown in Fig. 4.

As the rise 233 of the cam 219 on its counter-clockwise movement to normal position passes from under the roll 231 of the arm 230, the coil spring 232 rocks the arm 230 and shaft 212 counter-clockwise to restore the arms 210 and 211 and platen 185, to their normal positions as shown in Fig. 4.

An aligner 235 (Fig. 7) operated by the cam 219 locks the type setting and aligning wheels 109 to align the type wheels 99 and 100 in their adjusted positions just before the platen 185 is operated to take an impression. A lever 236, pivoted on a stud 237 mounted in the removable section 132 of the main side frame 30, is provided with a roller to cooperate with a cam slot 238 of the cam 219. The forwardly extending arm of the lever 236 is bifurcated to receive a stud of an arm 239 secured to an aligner shaft 240 extending between and journaled in the plates 133 and 134. Also secured to the shaft 240 is a pair of arms 241 (Fig. 27) connected by a bail which supports the aligner 235. Just before the cam 219 reaches the limit of its clockwise movement, and before the rise 233 (Fig. 4) cooperates with the roller of the arm 230 to operate the platen 185, due to the shape of the cam slot 238 (Fig. 7), the lever 236 receives a clockwise movement to rock the shaft 240 counter-clockwise to rock the aligner 235 into engagement with the type setting and aligning wheels 109 to properly align the type wheels in their adjusted positions.

An electro 250 (Fig. 4) is provided to print any desired information on the receipt, such as the name of the business, etc., as shown in Fig. 19.

The electro 250 normally rests in a channel of the block 129 supported by the plates 133 and 134 (Fig. 7), and is provided with studs 251 (only one of which is shown in Fig. 4) extending through apertures in the block 129. The lower part of the aperture is enlarged to receive coil springs 249 held by flanges on the studs 251. The springs 249 are compressed between the flanges of the studs 251 and the bottom of the enlarged part of the aperture of the block 129 and normally hold the electro 250 in the channel of the block 129.

A flexibly mounted cam plate 252 on the cam 219 lies in the plane of a roll on an arm 253 pinned to a shaft 254 supported by the plates 133 and 134. Near the end of the clockwise movement of the cam 219 the raised portion of the cam plate 252 cooperates with the roller on the arm 253 to rock the shaft 254 in a counter-clockwise direction. Upon such movement of the shaft 254, arms 255 pinned to the shaft 254 cooperate with the studs 251 of the electro 250 to raise the electro 250 and press the same against the record strip 234 which lies beneath a platen 256 firmly secured to the bail 192 which connects the arms 190 and 191, to take an impression from the electro. By the time the cam plate 219 has reached the limit of its clockwise movement, the raised portion of the cam plate 252 has passed slightly beyond the roll of the arm 253, thus allowing the springs 249 to withdraw the electro 250 from the platen 256 and return the shaft 254 to its normal position; the type wheel liner shaft 240 preventing any clockwise movement of the arms 255 past their normal positions.

On the return counter-clockwise movement of the cam 219, the cam plate 252 due to its pivotal mounting on the cam 219 is rocked clockwise about its pivot until the raised portion of the cam plate 252 escapes the roll on the arm 253, after which a spring 257 restores the cam plate 252 to its effective position.

Paper feed mechanism

The supply roll 265 for the receipt paper 234 (Figs. 10, 14, and 17) is suitably supported in a bracket 266 secured to the cross frame 187. The bracket 266 forms a portion of a protecting shield, the remaining part of the shield being clearly shown at 288 (Fig. 17). It is secured to the ribbon frame 317 and acts particularly as a shield against smearing the strip from the ink ribbon.

The paper is led from the supply roll over a guide stud 267 extending from the frame 130, to feed rollers 268 and 269. There are two rollers 268 and two rollers 269. The rollers 269 (Figs. 5 and 14) are carried by arms 270 and 271 pivoted on studs 278 on the arms 190 and 191 of the yoke 192. Torsion springs 272, one on each stud 278, each have one end bearing against a stud on the respective arm 270 and 271, the other ends bearing against the yoke 192, to place tension on the rollers 269 to grip the record strip between said rollers 269 and the feed rollers 268 to advance the strip.

The arms 270 and 271 have rearward projections 279 cooperating with the under side of the yoke 192 to limit the clockwise movement of the tension arms 270 and 271 under the influence of the springs 272 when the arms 190 and 191 and yoke 192 are raised to permit the insertion of a new supply roll.

Figure 7:
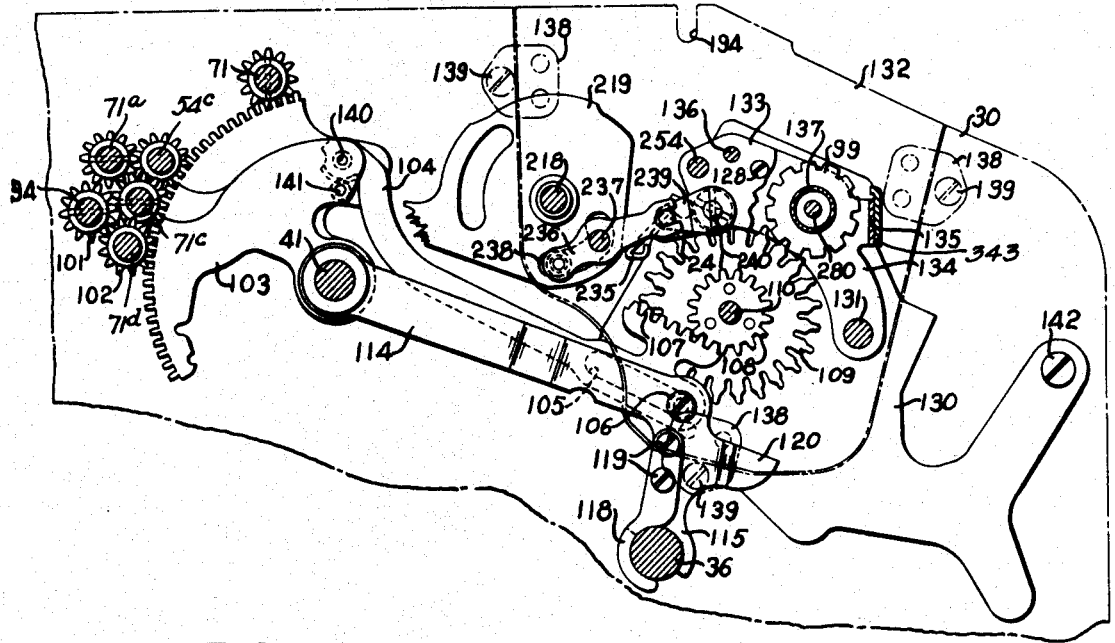
Fig. 7 is a side elevation of the type wheel setting mechanism.
Figure 8:
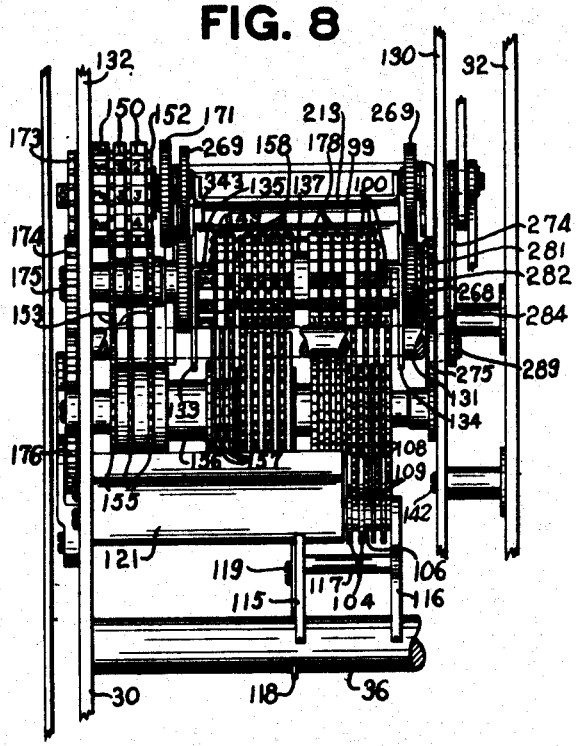
Fig. 8 is a front elevation of the type wheel line showing the consecutive number, the date setting wheels, and the receipt feeding rolls.
Figure 9:
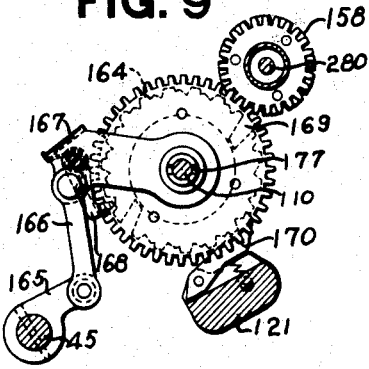
Fig. 9 is a detail view of the consecutive number operating mechanism.
Figure 10:
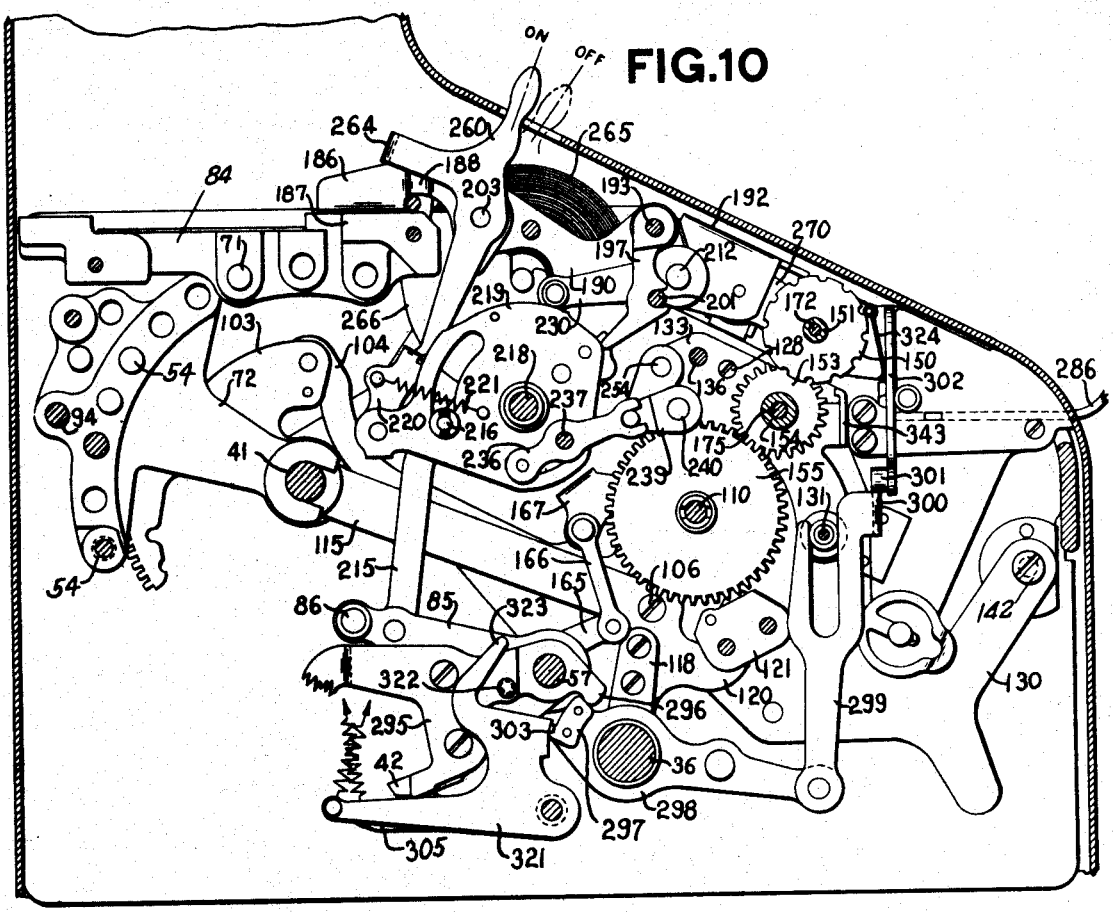
Fig. 10 is a side elevation, taken just inside the cabinet and the left side frame, showing a general view of the printer.
Figure 12:
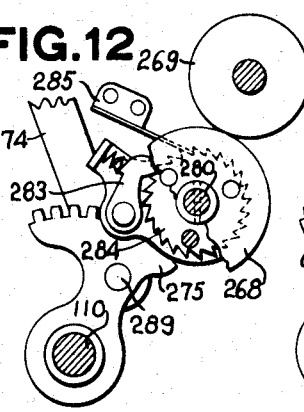
Fig. 12 is an enlarged detail view of the feeding rolls and their driving mechanism.
Figure 13:
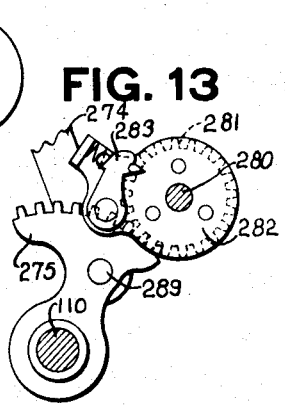
Fig. 13 is another detail view of the feeding mechanism with the feed rolls omitted.

The feed rollers 268 (Figs. 11, 12 and 13) are driven by the cam plate 46'. The upper end of the previously mentioned lever 56 has an L-shaped slot 273 into which projects a stud 276 on a link 274 connected at its opposite end to a feed segment 275 by means of a stud 289 projecting from the segment 275 through a slot in the printer frame 130. The feed segment 275 is journaled on the rod 110. A gear 281 (Fig. 13) turning on a feed shaft 280 meshes with the feed segment 275, and is secured to the side of a disk 282 which carries a feed pawl 283 to cooperate with a ratchet wheel 284 (Fig. 12) secured to the side of the right-hand feed roller 268 (Fig. 8). The feed shaft 280 has secured to it the feed rolls 268. This shaft is journaled at one end in the removable printer frame 130 (Figs. 7, 8, 11, 12 and 13) and extends through the tube 137 supporting the type wheels, and at its opposite end in the trunnion 154 (Fig. 10).

As the cam plate 46' rocks the feed lever 56 clockwise, this movement is transmitted by the link 274, segment 275 and gear 281 to the disk 282, and the pawl 283 ratchets over the teeth of the ratchet wheel 284. A spring plate 285 secured to the side of the printer frame 130 cooperates with the ratchet wheel 284 to prevent any counter-clockwise movement of the ratchet wheel 284 at this time. As the plate 46' returns to its normal position the lever 56, link 274, segment 275 and gear 281, rock the plate 282 clockwise to raise the pawl 283, which then turns the ratchet wheel 284 and feed rollers 268 clockwise, and as the strip 234 is gripped between the rollers 268 and 269, the printed receipt is fed between knives on to a table 286 (Fig. 14.)

The knives are then operated, by means to be later described, to sever the printed receipt from the strip, whereupon the receipt or check is in position on the table to be taken by the operator and given to the customer, or wrapped with the merchandise purchased.

A guard 324 (Figs. 5 and 14) hinged to a plate 325 fastened to the yoke 192, and tensioned by a spring 326, prevents the end of the receipt paper strip from curling after the receipt has been severed from the strip. This is particularly true when the supply roll is nearly exhausted, as at that time the paper tends to curl more than when unwound from a full roll.

Manual control of the impression and feed devices

A manipulative lever 260 (Figs. 4 and 10) pivoted on the studs 203 supporting the arms 190 and 191, has an upwardly extending arm projecting beyond the outline of the cabinet. This lever 260 determines whether or not a check will be printed and issued. When the lever is in its "on" position (Fig. 10) it controls the machine to issue a check, and when said lever is in the "off" position it disables the check feed and check impression mechanisms. A stud 261 mounted in a downwardly extending arm of the lever 260 lies in front of and projects into the plane of a lug 259 projecting at right angles from the pawl 220. Any clockwise movement of the lever 260 from its "on" to its "off" position, through the stud 261 and the lug 259, rocks the pawl 220 (Fig. 6) in a counter-clockwise direction against the tension of the spring 221 and disengages the hook 222 of the pawl 220 from the projection 223 of the arm 217. When the pawl 220 is thus disengaged from the arm 217, any clockwise movement of the latter upon depression of a key is not transmitted to the cam 219, and the stud 216 of the arm 217 travels idly in the slot 224 of the cam 219.

Since the cam 219 is disabled, the check impression mechanism cannot function, and consequently, the machine will not print on a check when the manipulative lever is in the "off" position.

A spring tensioned retaining arm 262 (Figs. 5 and 11) pivoted on a stud 258 projecting from the intermediate frame 32, is provided with notches to cooperate with a stud 277 in a forwardly extending arm of a lever 263 connected to the lever 260 by a bail 264. The retaining arm 262 and stud 277 provide a means to maintain the manipulative lever 260 in its "on" or "off" position.

The manipulative lever 260 (Fig. 11) also controls the feed rollers 268 to disable the feed of the receipt. The lever 263, it will be recalled, is connected to the manipulative lever 260 by the bail 264, and is forked at its forwardly extending end to cooperate with the stud 276 on the link 274. The upper fork is longer than the lower fork, and the bracket 196 has a flange 287. The long fork and flange 287 form a track in which the stud 276 slides when the link 274 is moved downwardly for the purpose previously described. Therefore, if during an operation of the machine with the lever 260 in the "on" position, an attempt is made to move the lever into the "off" position, the flange 287 acts as a stop for the stud 276 and prevents any clockwise movement of the lever 260. The lever 260 is prevented from any counter-clockwise movement during such an operation, by the upper edge of the guide slot in the cabinet (Fig. 10).

However, when the parts are all in their home positions, the lever 260 when rocked clockwise from its "on" to its "off" position, moves the stud 276 on the link 274 downwardly into the longer section of the L-shaped slot 273 which positions the stud 276 above an angle projection 290 of the flange 287, thus locking the stud 276 and link 274 against any movement. Now as the stud 276 is in the longer section of the L-shaped slot 273, the feed lever 56 rocks clockwise and does not move the stud 276 and the link 274. Therefore, the feed rollers 258 receive no movement and the strip is not fed when the impression is disabled.

Severing mechanism

After the receipt has been printed and advanced by the feed rollers to the receipt table, means is provided to sever the printed receipt from the supply roll. A plate 295 (Figs. 10 and 14) secured to the left side of the key coupler 42 is provided with a forwardly extending arm 296 to cooperate with a block 297 secured to a knife operating lever 298 journaled on the universal rod 36 supporting the various keys. The arm 296 surrounds the key coupler trunnion 57. The knife operating lever 298 is connected to an upright pitman 299 having a flange 300 (Figs. 14 and 15) formed at right angles thereto, to cooperate with a stud 301 mounted in a downwardly extending arm of a knife blade 302.

The knife blade 302 projects through a slot cut in a ribbon frame 317, to be hereinafter described, and is provided with a stud 315 journaled in a block 316 secured to the ribbon frame. A compression spring 318 mounted in the block 316 in front of the stud 315, normally tends to press the right end (Fig. 15) of the knife blade 302 against a stationary blade 319 so that the blade 302 will shear well. The stationary blade 319 is firmly secured to a cross bar 320 extending between the ribbon frame 317 and an auxiliary plate 309 secured to the bars 310 and 320 fastened to the ribbon frame. The left end of the knife blade is held in shearing relation with the stationary blade 319 by an anti-friction roller 311 carried by the plate 309. The blade 302 is held in normal position by a spring 307 and a finger 312 of the knife blade, which finger contacts the ribbon frame 317 thereby limiting the movement of the blade in one direction.

Upon the depression of a key, the arm 296 (Figs. 10 and 14) is rocked clockwise with the key coupler 42, and by its contact with the block 297 rocks the knife operating lever 298 counter-clockwise and raises the pitman 299, thus rocking the knife blade 302 and tensioning the spring 307. During such movement of the blade 302 the roller 311 prevents the blade from moving laterally away from the stationary blade 319.

At the time the depressed key arrives at the maximum of its downward movement, a shoulder 303 (Fig. 14) of the block 297 cooperates with a hook 304 of a spring-tensioned arm 305 pivoted on a stud projecting inwardly from the left main side frame 38. As the shoulder 303 passes the hook, the arm 305 snaps the hook 304 over the shoulder 303 and retains the knife blade 302 in its raised or cocked position until the depressed key is returned to its normal position. As the key coupler 42 comes to rest it strikes a lug 306 on the arm 305 and withdraws the hook 304 from the shoulder 303, thereby releasing the lever 298, whereupon the spring 307 having been tensioned by the raising of the knife blade, forcibly returns the knife blade 302 to its normal position and severs the printed receipt from the strip 234.

Supply roll replacement

When necessary to insert a new supply roll the operator depresses the release arm 200 (Figs. 5, 14 and 14A) and as it is fast to the shaft 193, the locking pawls 197 and 198 are rocked clockwise and are released from the studs 201 and 202 respectively. When the operator removes his finger from the release arm 200, the pressure of the spring 272, bearing against the yoke 192, rocks the arms 190 and 191 slightly in a counter-clockwise direction which raises the locking pawls 197 and 198 a short distance, so that as the spring 199 rocks the pawls counter-clockwise, the notches in said pawls will not engage the studs 201 and 202, thus leaving the upper feed roller and platen frame unlatched. Now the operator may, by lifting on the yoke 192, rock the arms 190 and 191, the upper feed rolls 269, and the platens 185 and 256 as a unit around the studs 203, so that a fresh supply roll 265 may be easily placed in the bracket 266. The section 288 of the paper shield, being secured to the frame 317, is not raised with the platen frame. As the unit is raised towards a vertical position a slot 330 (Fig. 14) in each of the arms 190 and 191 permits a shoulder 331 of the arms 190 and 191 to drop in front of a flattened stud 332 carried by the arms 188 and 189 of the bracket 186, thereby retaining the unit in its raised position.

The counter-clockwise movement of the platen unit also raises the knife blade 302 by the following means. An L-shaped link 333 (Figs. 14 and 15) pivoted on a stud 334 on the arm 190, has a slot 336 into which projects a stud 335 mounted in the knife operating lever 298 and projecting through a slot in the main side frame 38. As the platen and tension or upper feed roller frame unit is rocked in a counter-clockwise direction, the link 333 is raised, thus rocking the knife operating lever 298 counter-clockwise and raising the pitman 299 to raise the knife blade 302. When the arms 190 and 191 have been raised to the position where the shoulder 331 of the arms 190 and 191 cooperates with the flat stud 332 to retain the unit in its raised position, the shoulder 303 of the block 297 is retained by the hook of a spring arm 321, thus leaving the knife blade in the raised position. In the home position of the machine, the key coupler rests on the latch 304 and holds the latch out of its effective position. For this reason another latch must be provided to temporarily hold the knife blade in its raised position. The latch arm 321 is therefore provided for this purpose.

In order to return the unit to its normal position, the unit is lifted upwardly until the shoulder 331 clears the stud 332, and then rocked clockwise until the notches in the locking pawls 197 and 198 snap over the studs 200 and 201.

When the platen unit is returned to normal position, the L-shaped link 333 does not return the knife operating lever 298 to normal position, as the latter is retained by the spring tensioned arm 321. The upper section of the notch 336 of the link 333 is concentric with the universal rod 36, and therefore, moves idly over the stud 335, the knife operating arm 298 being retained in its moved position until the following operation of the machine.

During such operation, as the key coupler 42 (Fig. 14) reaches the limit of its clockwise movement, a stud 322 thereon strikes the finger 323 and rocks the spring tensioned arm 321 slightly counter-clockwise to withdraw the hook from the shoulder 303 of the block 297. The key coupler 42 being rocked away from the lug 306 of the spring arm 305 permits the hook 304 of the arm 305, which is slightly above the hook of the spring arm 321, to retain the knife operating lever 298 in its cocked position until the key coupler 42 returns to its normal position. As the coupler 42 reaches normal it strikes the lug 306 and releases the knife operating lever 298, whereupon the knife blade 302 severs the printed receipt.

Ribbon feeding mechanism

The ribbon feeding and reversing mechanisms illustrated are of the general type disclosed in the Kettering and Chryst Patent, No. 1,137,061, and the Rosien Patent No. 1,578,209. The ribbon frame 317 supports spools 340 and 341 (Figs. 17 and 20) upon which a ribbon 342 (Fig. 17), is fed from one spool to the other spool until a predetermined amount has been fed, after which the feeding mechanism is reversed, to feed the ribbon in the opposite direction to wind it upon the spool from which it was unwound. The ribbon 342 (Fig. 17), is guided over the electro block 129 and a guard 343 secured to the bail 135 (Figs. 7 and 8).

Secured to the shaft 46 supported by the bar 43, is an arm 344 (Figs. 17 and 18) carrying a stud 345 entered into a notch 346 of a feed plate 347. The feed plate 347 is provided with studs 348 and 349 projecting into slots 350 and 351 respectively, of an auxiliary ribbon frame 352 secured to the printer frame 130 by screws 353. On the depression of a key, as the shaft 46 rocks first clockwise, the feed plate 347, through the stud 345 of the arm 344 cooperating with the notch 346 is shifted to the right. As the shaft 46 is rocked counter-clockwise to normal, the feed plate 347 is returned to normal and during such movements of the plate, the studs 348 and 349 slide in the slots 350 and 351 of the auxiliary ribbon frame 352.

A stud 354 mounted on the feed plate 347 supports two feeding levers 355 and 356 for winding the ribbon upon the spools, one being effective while winding on the spool associated therewith, and the other one effective when winding upon the other spool. The feeding levers 355 and 356 are provided with right-angled flanges 357 and 358, respectively, to cooperate with ratchet wheels 359 and 360 secured to the ribbon spools 340 and 341 respectively.

The feeding levers 355 and 356 are provided with downwardly extending arms 361 and 362 extending on opposite sides of a stud 363 of a retaining arm 364. A spring 365 stretched between the levers 355 and 356 holds the arms 361 and 362 against the stud 363, thus retaining the levers 355 and 356 in their effective or ineffective position, as the case may be, depending upon which spool the ribbon is being wound. A spring tensioned pawl 366 (Fig. 20) aligns the arm 364 in position.

Therefore, as the feed plate 347 is moved to the right (Fig. 18) the flange 357 of the feeding lever 355 cooperates with the ratchet wheel 359, turning it counterclockwise to wind the ink ribbon onto the spool 340. As the feed plate 347 is drawn to the left to its normal position the flange 357 of the feed lever 355 ratchets over the teeth of the wheel 359 without effecting any clockwise movement of the spool 340. The flange 358 of the lever 356 at this time is held out of cooperative relation with the ratchet wheel 360 of the spool 341 by the stud 363 of the arm 364 retaining the arm 362 of the feed lever 356 in its retracted position. Therefore, during the feeding movement of the lever 357 the feed lever 356 moves idly back and forth.

The flanges 369 of the spools 340 and 341 are each provided with a recess 370 (Fig. 20). A plate 371 pivoted on the side of each flange 369 has a portion of its peripherry concentric with the center of the spool, and as that portion overlaps the recess, the plate and flange 369 form a complete disk. An ear 372 projecting laterally from the plate 371 forms a means, when the ribbon is wound upon the spool over the ear 372, to hold the plate in the position shown in Fig. 20. These spools are known as collapsible spools, and are substantially the same as those illustrated and described in the previously mentioned Rosien Patent, No. 1,578,209.

Reversing levers 373 and 374 (Fig. 20) pivoted on the auxiliary ribbon frame 352 are each provided with a lug 375 bearing on the periphery of the spool under the influence of a spring 376 associated with each reversing lever. As viewed in Fig. 18, the ink ribbon is being wound upon the right-hand spool and unwound from the left-hand spool. When the ink ribbon has been completely unwound from the left-hand spool, thus releasing the ear 372 of the plate 371, the spring 376 of the reversing lever 374 rocks the lever 374 in counter-clockwise direction and the lug 375 rocks the plate 371 around its pivot point when the recess 370 of the flange 369 is opposite the lug 375. This counter-clockwise movement of the reversing lever 374 positions a finger 377 to the right of the stud 363 in the arm 364. Now, as the plate 347 is moved to the right, the arm 364 and aligner 366 being mounted on the feed plate 347 move therewith, and as the finger 377 of the reversing lever 374 is in the path of the stud 363 and holds the latter, the pivot stud 354 of the arm 364 is carried to the right with the feed plate 347. As the result of this, the arm 364 is rocked in a clockwise direction and the aligner 366 snaps into the upper notch 367 and retains the arm 364 in its rocked position. When the arm 364 is in its rocked position, the return movement of the feed plate 347 causes the stud 363 to push on the arm 361 of the feed lever 355 and rock the same clockwise around its pivot 354 to withdraw the flange 357 out of cooperative relation with the ratchet wheel 359. At the same time the spring 365 rocks the feed lever 356 clockwise to engage the flange 358 thereof with the ratchet wheel 360. With the parts in the positions just described, upon operation of the machine, the ribbon feed is reversed and the ink ribbon is wound upon the left-hand spool 341.

After the ink ribbon has been completely unwound from the right-hand spool 340, the reversing lever 373 associated with the right-hand spool is permitted to rock in a clockwise direction, thus raising its finger 378 into the path of the stud 363, so that when the feed plate 347 is moved to the left, the finger 378 stops the stud 363 and the arm 364 is thereby rocked back to the position shown in Fig. 20, whereupon the flange 358 is withdrawn from cooperative relation with the ratchet wheel 360, and the flange 357 again moved into operative relation with the flange 359. The ribbon will now feed as first described.

The ribbon frame 317 (Fig. 17) is mounted above the printer frame 130 and guided between plates 385 secured to each side of the printer frame 130.

A plunger 386 (Figs. 16 and 17) enters a half-round hole in the frame 317 and locks the latter in the machine. The shaft 193 carried by the arms 190 and 191 (Fig. 5) enters a notch 387 (Fig. 17) which also aids in locking the ribbon frame 317 in position. By raising the arms 190 and 191 as previously described, and withdrawing the plunger 386 from the half-round hole, the ribbon frame 317 may be removed from the machine as a unit.

After the ribbon frame 317 has been removed, the printer frame 130 and the frame section 132 carrying the type wheel (Fig. 7) may also be removed as a completely assembled unit after removing the screws 139 which secure the frame section 132 to the main side frame 30, and the screws 142 (Fig. 17) which secure the printer frame 130 to the intermediate frame 32. From the above description it is very clear that the printer can be completely assembled or disassembled in separate units.

Modified form of the impression mechanism

Figure 21:
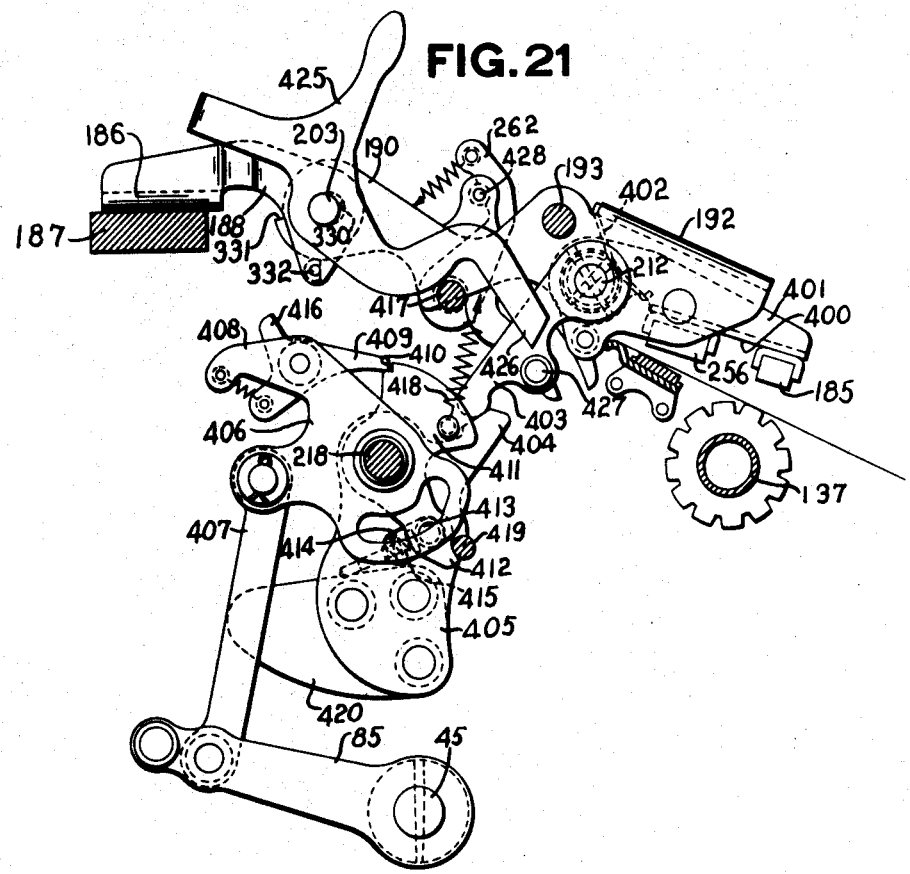
Fig. 21 is a detail view of a modified form of a platen, its operating mechanism, and a manual control therefor.

While the impression means of this invention is operated preferably by the squeeze method, Fig. 21 shows a modified form or blow type of an impression means which is adapted to be used in the machine illustrated. The type wheel platen 185 and the electro platen 256 are carried by inverted channel bars secured to the under side of a yoke 400 connecting a pair of arms 401 (only one of which is shown) fastened to the shaft 212 carried by the arms 190 and 191.

A torsion spring 402 carried by the shaft 212 and having one end bearing against the rear end of the yoke 192 and the other end hooked under the arm 401 normally tends to rock the shaft 212 in a clockwise direction, thus holding the end of an arm 403, also secured to the shaft 212, in contact with a projection 404 of a platen operating lever 405 pivoted on the stud 218 mounted in the removable section 132 of the left main side frame.

Also pivoted on the stud 218 is a bell crank 406 connected by a link 407 to the beam actuator arm 85, which, it will be remembered, is fast to the rock shaft 45. An upwardly extending arm 408 of the bell crank 406 is provided with a spring tensioned pawl 409 to cooperate with a notch 410 of a driving lever 411. An arm 412 of the driving lever 411 carries a stud 413 projecting into a slot 414 of the operating lever 405 and cooperates with a spring-pressed plunger 415 to form a driving connection between the driving lever 411 and the operating lever 405.

Therefore, on the clockwise movement of the shaft 45, the bell crank 406, through its link connection to the arm 85, is also rocked in a clockwise direction. During such movement of the bell crank 406 the pawl 409 cooperates with the notch 410 to push the driving lever 411 and its arm 412 in a clockwise direction against the tension of a strong spring 418. This clockwise movement of the driving lever 411 and arm 412, through the stud 413 and plunger 415, rocks the hammer operating lever 405 clockwise to withdraw the projection 404 away from the arm 403. The arm 403 and shaft 212 are limited in their counter-clockwise movement, due to the tension of the spring 402, by the yoke 192 obstructing the movement of the arms 401, since the latter are also secured to the shaft 212.

Near the limit of the clockwise movement of the bell crank 406, which is reached at the same time that the amount key reaches the limit of its downward movement, a tail 416 of the pawl 409 contacts a stud 417 in axial alignment with the pivot of the aligning arm 262 and projecting inwardly from the removable section 132 of the left main side frame.

This contact of the tail with the stud removes the nose of the pawl 409 from the notch 410 of the driving lever 411, whereupon the spring 418 quickly and forcibly rocks the driving lever 411 counter-clockwise until the arm 412 thereof is arrested by a stud 419 projecting laterally from the removable section 132 of the left main side frame.

The operating lever 405, through the plunger 415 and stud 413, is likewise rocked very rapidly in a counter-clockwise direction, and when the arm 412 is stopped the lever 405 continues in its movement, it having gained sufficient momentum by the use of a weight 420 attached to its lower end, whereby the projection 404 strikes the arm 403 and drives the latter and shaft 212 in a clockwise direction to bring the platens 185 and 256 against the type to make an imprint on the receipt paper.

The above described movement of the operating lever 405 carries it beyond its normal position which is permitted by the slot 414 and plunger 415, the plunger 415 returning the operating lever 405 to its normal position immediately after the impression is made.

A manual means is provided to disable the impression. This means includes a manipulative lever 425 having "on" and "off" positions. This lever is supported by the studs 203 and has a forwardly extending finger 426 adapted to be moved into the path of a stud 427 mounted on the arm 403. When the finger 426 is in the path of the stud 427 the arm 403 is prevented from any clockwise movement which it normally receives from the projection 404 of the operating lever 405, thus disabling the platens so that no impression can be made on the receipt paper.

The manipulative lever 425 is aligned in its "on" or "off" position by the previously described arm 262 cooperating with a stud 428 on said lever 425.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed as new, is:

1. In a machine of the class described, the combination with type carriers; and impression means; of a cam to operate the impression means, a pawl mounted on the cam; means to drive the cam through the pawl; a rock shaft; connections between said means and the rock shaft to drive the means; and manually operated devices to operate the rock shaft.

2. In a machine of the class described, the combination with type carriers; and impression means; of a cam to operate the impression means; a driving member on the cam; a driving arm having a projection to cooperate with said member to actuate the cam in one direction; means on said arm to return the cam to its normal position; a manipulative member operable at the will of the operator, having a plurality of positions, and when adjusted to one of its positions said manipulative member rocks the driving member into an ineffective position relative to the projection on the driving arm; and resilient means to reengage said driving member with said projection when the manipulative member is adjusted to another position.

3. In a machine of the class described, the combination of severing means; a rockable key coupler; means to rock the severing means prior to the cutting movement thereof; a member to support said rocking means; and means controlled by said key coupler to lock the severing means in its rocked position, said last-mentioned means being released by the key coupler as the latter returns to its normal position.

4. In a machine of the class described, the combination of a severing device; a rockable key coupler; manually operated means to rock the key coupler; a lever; means attached to the key coupler to rock said lever; means carried by the lever to rock the severing device; and means under control of said key coupler to retain the lever in its rocked position to hold the severing device in its rocked position, and adapted to be released when the key coupler returns to its normal position to release the rocked severing device.

5. In a machine of the class described, the combination of severing means; a rockable key coupler; a lever supporting a pitman; a projection on the key coupler to rock the lever; a flange on the pitman to rock the severing means; a spring tensioned arm to retain the lever in its rocked position; means on said arm to cooperate with the key coupler to release the lever; and resilient means to actuate the rocked severing means and return the lever to its normal position.

6. In a machine of the class described, the combination of a severing device adapted to be rocked by operation of the machine and by manually operable means; a pivoted member; means carried by said pivoted member to rock the severing device; retaining means rendered effective to hold the severing device in its manually rocked position and adapted to be rendered ineffective during the operation of the machine; and another retaining means adapted to be rendered effective, when the first-named retaining means becomes ineffective, during the operation of the machine to retain the severing device in its machine rocked position; and means to release said last-mentioned retaining means at the end of the operation.

7. In a machine of the class described, the combination with a severing means; and a rockable key coupler; of a lever adapted to be rocked by the key coupler to rock the severing means; a shoulder on said lever; a retaining arm having a hook to cooperate with the shoulder of the lever; a second retaining arm having a hook slightly below the hook of the first mentioned retaining arm to cooperate with said shoulder; and a stud mounted in the key coupler to control the effectiveness of the second retaining arm during the movement of the key coupler, while allowing the lever to be retained by the first mentioned retaining arm which is released by the return movement of the key coupler whereby the lever is released to free the severing means from its rocked position.

8. In a machine of the class described, the combination with impression means; and feed rollers; of arms for supporting the feed rollers and impression means and adapted to be rocked about their mounting to facilitate the replacing of the supply roll; severing means; a key coupler; means to rock the severing means by the key coupler; means to retain the severing means in its rocked position and adapted to be released by the key coupler; means carried by said arms to rock the severing means when the arms are rocked preparatory to inserting a new supply roll; and a second means to retain the severing means in its rocked position when the same is rocked by operation of said arms, and means to release the second retaining means as the first retaining means becomes effective.

9. In a machine of the class described, the combination with impression means; and feed rollers; of arms for supporting the feed rollers and impression means and adapted to be rocked about their mounting to facilitate the replacing of the supply roll; severing means; a key coupler; means to rock the severing means from the key coupler; means to retain the severing means in its rocked position and adapted to be released by the key coupler; means to rock the severing means by the arms supporting the impression means and feed rollers when said arms are rocked prior to the insertion of a new supply roll; a second retaining means to retain the severing means in its rocked position when the same is rocked by operation of said arms; and means carried by the key coupler to release said second retaining means during the subsequent operation.

10. In a machine of the class described, the combination with impression means and feed rollers; of arms for supporting the feed rollers and impression means, said arms adapted to be rocked about their mounting to facilitate the insertion of a supply roll; severing means; a key coupler; a pivoted member; means carried by the pivoted member to rock the severing means; a connection intermediate the pivoted member and said arms to rock said pivoted member when the arms are rocked to insert a new supply roll; means to retain the pivoted member in its rocked position; and means carried by the key coupler to release said retaining means during the subsequent operation.

11. In a machine of the class described, the combination with receipt printing mechanism; and severing means; of arms supporting feed rollers and impression means and adapted to be rocked on their mounting to facilitate the insertion of a supply roll; a key coupler; a pivoted member; a link carried by the arms which support the impression means and the feed rollers, to cooperate with a stud mounted in the member to rock the same to rock the severing means when the arms are rocked preparatory to placing a supply roll in the machine; and means to retain the severing means in rocked position and the pivoted member in adjusted position, and allow said link to return to normal when the arms are restored after the insertion of a supply roll.

12. In a machine of the class described, the combination with receipt printing mechanism; and severing means; of arms supporting feed rollers and impression means and adapted to be rocked on their mounting to facilitate the insertion of a supply roll; a key coupler; a member to rock the severing means; a link intermediate the member and said arms to rock said member to rock the severing means when the arms are rocked prior to the insertion of a supply roll; an arm to retain said member in its rocked position; and a projection on said retaining arm to cooperate with means on the key coupler to release the member during the subsequent operation.

13. In a machine of the class described, the combination with a severing means; and a key coupler; of arms for supporting the impression means and feed rollers; a lever; means carried by said lever to rock the severing means; means to rock said lever from the key coupler; means to rock the lever from said arms to rock the severing means; a plurality of means to retain the lever in its rocked position, one of said retaining means being operable when the lever is rocked by the key coupler and another of the retaining means being operable when the lever is rocked by said arms; and means to release all of the retaining means during the operation of the machine.

14. In a machine of the class described, the combination of a severing device; a rockable key coupler; a lever; means carried by the key coupler to rock the lever; manual means to rock the lever; a connection between the lever and the severing device to move the severing device preparatory to its cutting movement; means, including two latches, one adapted to latch the severing means in the moved position when moved by the key coupler, and the other adapted to latch the key coupler when moved by the manual means; and means on the key coupler to withdraw the latch moved by the manual means when the key coupler is moved out of its normal position, the other latch adapted to be withdrawn by the key coupler when the key coupler returns to its normal position, to release the lever and severing means.

BERNIS M. SHIPLEY.